US008854832B2

(12) United States Patent
Yoon

(10) Patent No.: US 8,854,832 B2
(45) Date of Patent: Oct. 7, 2014

(54) GROUNDING STRUCTURE OF HIGH VOLTAGE SECONDARY BATTERY FOR VEHICLE

(75) Inventor: Jongguk Yoon, Daejeon (KR)

(73) Assignee: SK Innovation Co., Ltd. (KR)

( * ) Notice: Subject to any disclaimer, the term of this patent is extended or adjusted under 35 U.S.C. 154(b) by 160 days.

(21) Appl. No.: 13/557,308

(22) Filed: Jul. 25, 2012

(65) Prior Publication Data

US 2013/0026824 A1 Jan. 31, 2013

(30) Foreign Application Priority Data

Jul. 25, 2011 (KR) ........................ 10-2011-0073688

(51) Int. Cl.
*H05K 7/14* (2006.01)
*H05K 7/18* (2006.01)
*B60L 3/00* (2006.01)

(52) U.S. Cl.
CPC ............. *B60L 3/0069* (2013.01); *B60L 3/0046* (2013.01); *Y02T 90/14* (2013.01)
USPC .......................................... 361/799; 361/753

(58) Field of Classification Search
CPC ...... B60L 3/0046; B60L 3/0069; Y02T 90/14
USPC ................... 361/20, 42, 799, 753; 439/74, 75
See application file for complete search history.

(56) References Cited

U.S. PATENT DOCUMENTS

| | | | | |
|---|---|---|---|---|
| 4,929,185 | A * | 5/1990 | Wong et al. | 439/74 |
| 7,560,935 | B2 * | 7/2009 | Morimoto | 324/525 |
| 2006/0158162 | A1 * | 7/2006 | Inaba et al. | 323/237 |
| 2012/0187899 | A1 * | 7/2012 | Ozaki | 320/106 |
| 2012/0255799 | A1 * | 10/2012 | Kohler et al. | 180/65.245 |

FOREIGN PATENT DOCUMENTS

| | | |
|---|---|---|
| JP | 2003106319 | * 9/2003 |
| JP | 2004364356 | 12/2004 |
| JP | 2009184611 | 8/2009 |
| KR | 100696673 | 3/2007 |

* cited by examiner

*Primary Examiner* — Yuriy Semenenko
(74) *Attorney, Agent, or Firm* — Cantor Colburn LLP

(57) ABSTRACT

Provided is a grounding structure of a high voltage secondary battery for a vehicle capable of securing stable ground potential of various electric devices included in the vehicle and reducing a risk factor that may be generated due to a potential difference by connecting a battery pack including a secondary battery and an inverter for the vehicle provided in the next generation vehicle such as a hybrid electric vehicle (HEV), an electric vehicle (EV), a plug-in hybrid electric vehicle (PHEV) to each other by a ground wire formed of an electric wire in order to allow a vehicle body and a battery pack to have equipotential.

5 Claims, 5 Drawing Sheets

GROUNDING STRUCTURE OF HIGH VOLTAGE SECONDARY BATTERY FOR VEHICLE

CROSS-REFERENCE TO RELATED APPLICATIONS

This application claims priority under 35 U.S.C. §119 to Korean Patent Application No. 10-2011-0073688, filed on Jul. 25, 2011 in the Korean Intellectual Property Office, the disclosure of which is incorporated herein by reference in its entirety.

TECHNICAL FIELD

The following disclosure relates to a grounding structure of a high voltage secondary battery for a vehicle, and more particularly, to a grounding structure of a high voltage secondary battery for a vehicle capable of securing a stable ground potential of various electric devices of the vehicle and reducing a risk factor that may be generated due to a potential difference.

BACKGROUND

Generally, research into a secondary battery capable of being charged and discharged unlike a primary battery has been actively conducted in accordance with the development of state-of-the-art fields such as a digital camera, a cellular phone, a laptop computer, a hybrid vehicle, and the like. An example of the secondary battery includes a nickel-cadmium battery, a nickel-metal hydride battery, a nickel-hydrogen battery, and a lithium secondary battery.

Among them, the lithium secondary battery, which has an operating voltage of 3.6 V or more, is used as a power supply of a portable electronic device or a plurality of lithium secondary batteries are connected in series with each other to thereby be used for a high output hybrid vehicle. Since this lithium secondary battery has an operating voltage three times higher than that of the nickel-cadmium battery or the nickel-metal hydride battery and is more excellent in view of energy density characteristics per unit weight than the nickel-cadmium battery or the nickel-metal hydride battery, the use of the lithium secondary battery has rapidly increased.

Generally, the hybrid vehicle means a vehicle driven by efficiently combining two kinds or more of power sources with each other in a wide sense. However, in most cases, the hybrid vehicle means a vehicle obtaining driving force by an engine using fuel and an electric motor driven by power of a battery. This hybrid vehicle is called a hybrid electric vehicle (HEV).

In addition, the battery as described above may be applied to the next generation vehicle such as a plug-in hybrid electric vehicle (PHEV) and an electric vehicle (EV) as well as the HEV.

The next generation vehicle is necessarily mounted with a high voltage battery configured of the lithium secondary battery as shown in FIG. 1 in order to provide driving power of the electric motor. This battery supplies required power while being repeatedly charged/discharged during driving of the vehicle.

Generally, the high voltage battery provided in the next generation vehicle as described above has a very high voltage of about 680 V. Therefore, in the case in which the voltage of the battery is different from a potential of a vehicle body, it is difficult to maintain an electrically stable state, such that there is a risk that several problems may occur.

According to the related art, as a method of managing a voltage of a battery pack, a battery managing system that may be used in a vehicle using electric energy has been disclosed in Korean Patent Registration No. 10-0696673. However, a technology disclosed in Korean Patent Registration No. 10-0696673 is different from a technology of maintaining the potential of the vehicle body and the potential of the battery so as to be the same as each other.

Therefore, in the next generation vehicle, a technology of allowing a high voltage battery and a vehicle body to have equipotential is significantly required.

RELATED ART DOCUMENT

Patent Document

Korean Patent No. 10-0696673 (entitled “Battery Management System and Driving Method Thereof”, registered on Mar. 12, 2007)

SUMMARY

An embodiment of the present invention is directed to providing a grounding structure of a high voltage secondary battery for a vehicle capable of securing stable ground potential of various electric devices included in the vehicle and reducing a risk factor that may be generated due to a potential difference by connecting a battery pack including a secondary battery and an inverter for the vehicle provided in the next generation vehicle such as a hybrid electric vehicle (HEV), an electric vehicle (EV), a plug-in hybrid electric vehicle (PHEV) to each other by a ground wire formed of an electric wire in order to allow a vehicle body and a battery pack to have equipotential.

In one general aspect, a grounding structure of a high voltage secondary battery for a vehicle for grounding a secondary battery provided in a vehicle to allow the entire vehicle to have equipotential, includes: a battery pack having a plurality of secondary batteries combined in series or parallel with each other and received in a battery case; and an inverter for a vehicle converting direct current (DC) voltage output from the battery pack into alternate current (AC) voltage and then outputting the converted AC voltage, wherein the battery pack and the inverter for a vehicle are connected to each other by a ground wire formed of an electric wire.

The grounding structure may further include a bolt insertion groove formed both at a predetermined region of the battery case and at a predetermined region of an outer portion of the inverter for a vehicle, such that the ground wire is wound around the bolts inserted into the bolt insertion grooves at both ends thereof to thereby be fixed.

The grounding structure may further include a washer provided between the bolt insertion grooves formed in the battery case and the inverter for a vehicle and the bolts inserted in the bolt insertion grooves.

The washer may be a toothed lock washer formed in a sawtooth shape.

A predetermined region of the battery case fixed so that the ground wire is connected thereto may be in a state in which it is not painted by paint.

The ground wire may be connected at the shortest length.

DETAILED DESCRIPTION OF MAIN ELEMENTS

| | |
|---|---|
| 10: grounding structure of high voltage secondary battery | |
| 100: battery pack | 110: secondary battery |
| 120: battery case | |
| 200: inverter for vehicle | 300: ground wire |
| 310: terminal | 400: bolt |
| 410: bolt insertion groove | 500: washer |

DETAILED DESCRIPTION OF EMBODIMENTS

Hereinafter, a grounding structure of a high voltage secondary battery for a vehicle according to an exemplary embodiment of the present invention having the above-mentioned characteristics will be described in more detail with reference to the accompanying drawings.

Figure 1:
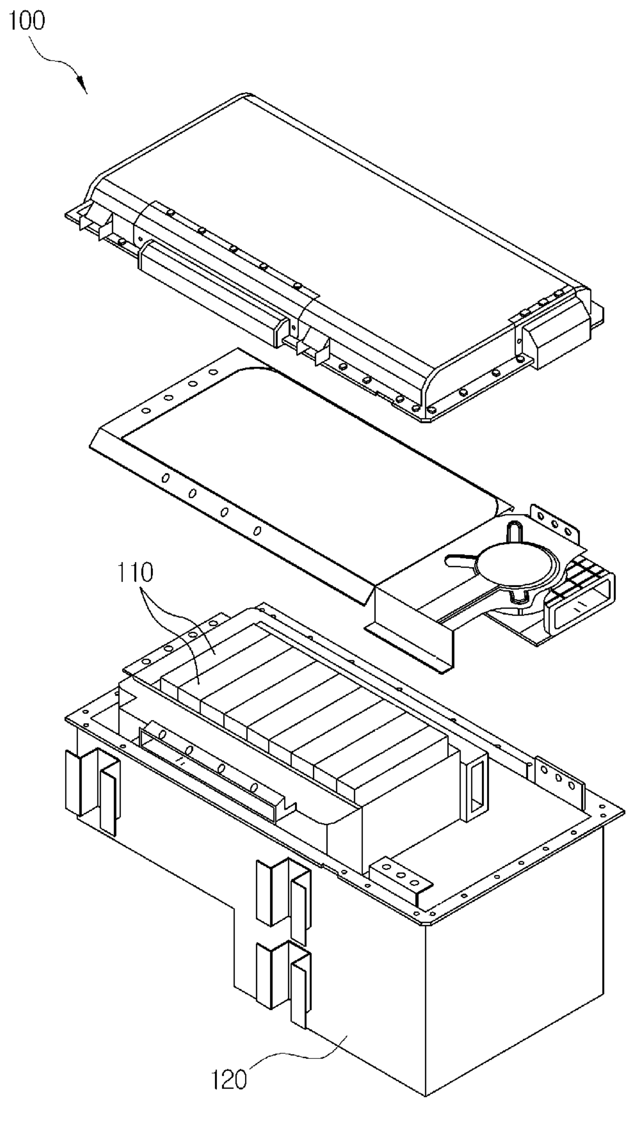
FIG. 1 is an exploded perspective view showing a general high voltage battery.
Figure 2:
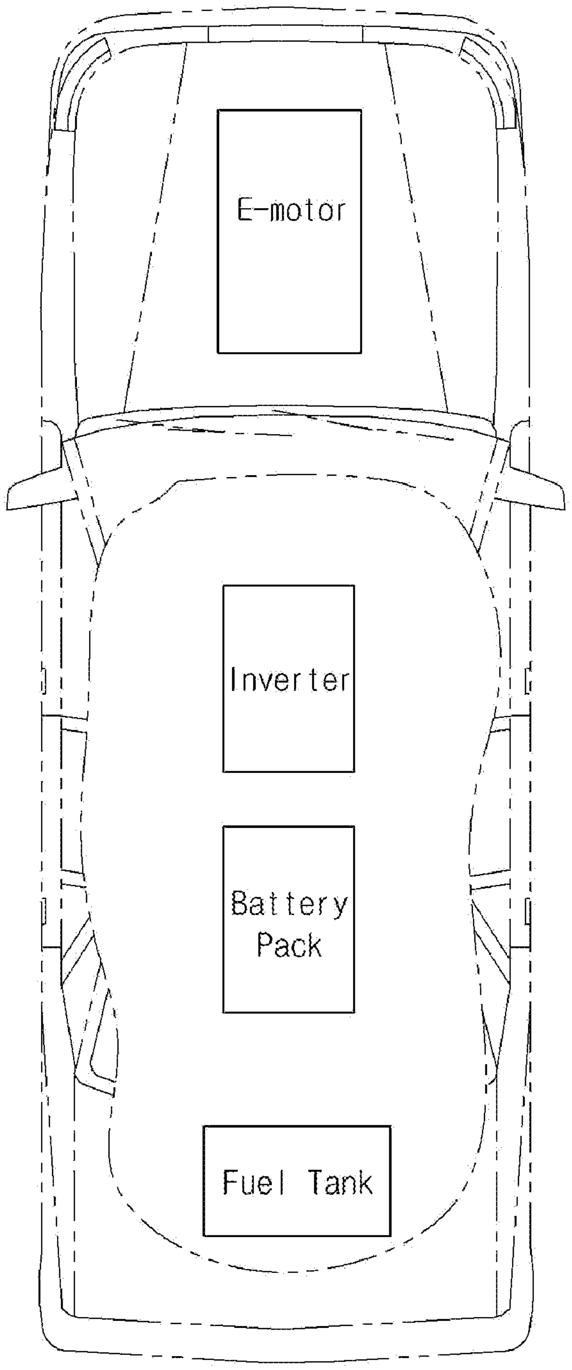
FIG. 2 is a plan view of a vehicle in which a battery pack is mounted.
Figure 3:
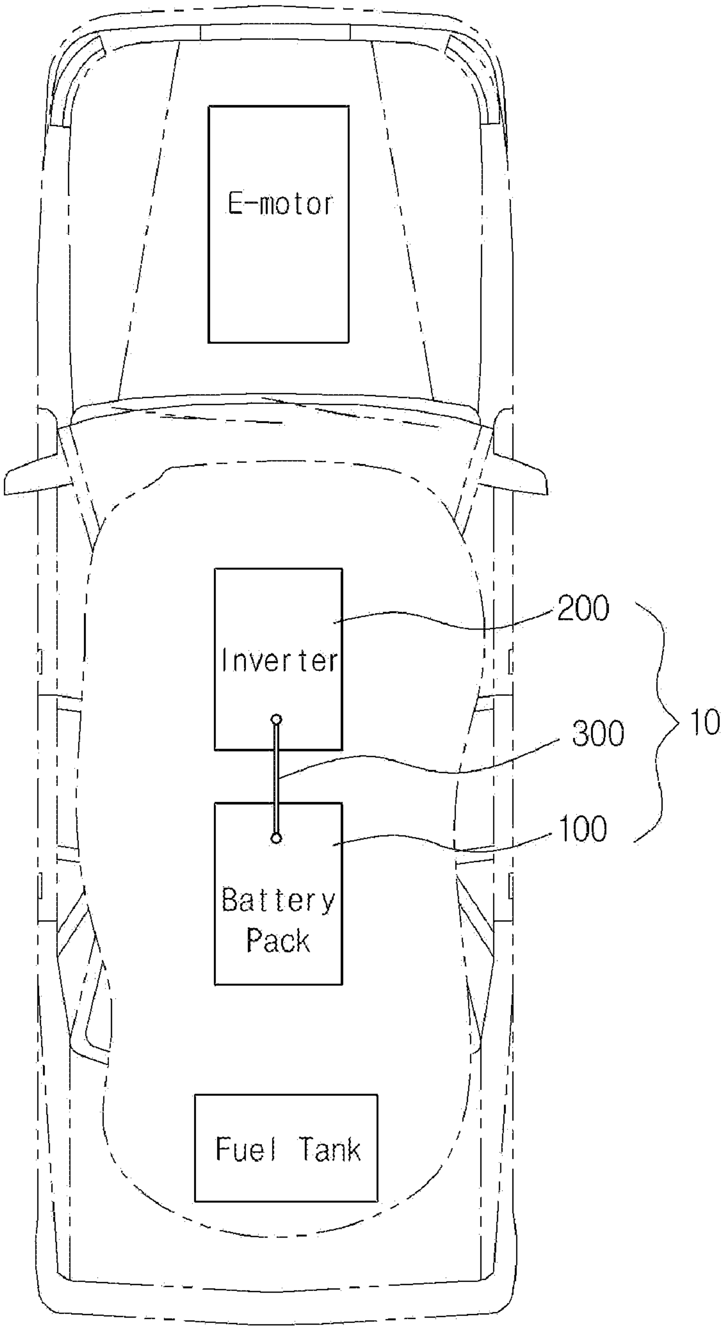
FIG. 3 is a plan view of a hybrid vehicle to which a grounding structure of a high voltage secondary battery for a vehicle according to an exemplary embodiment of the present invention is applied.
Figure 4:
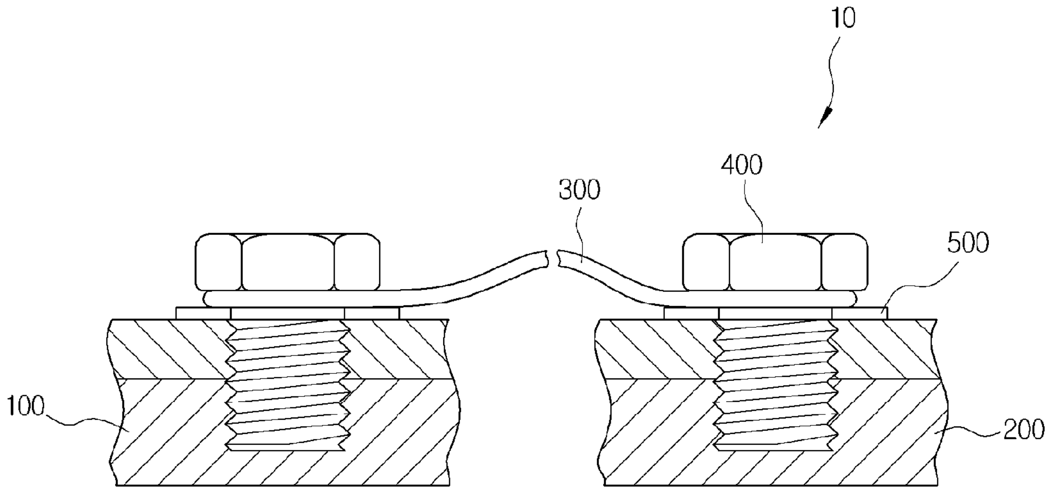
FIG. 4 is a front view showing the grounding structure of a high voltage secondary battery for a vehicle according to the exemplary embodiment of the present invention.
Figure 5:
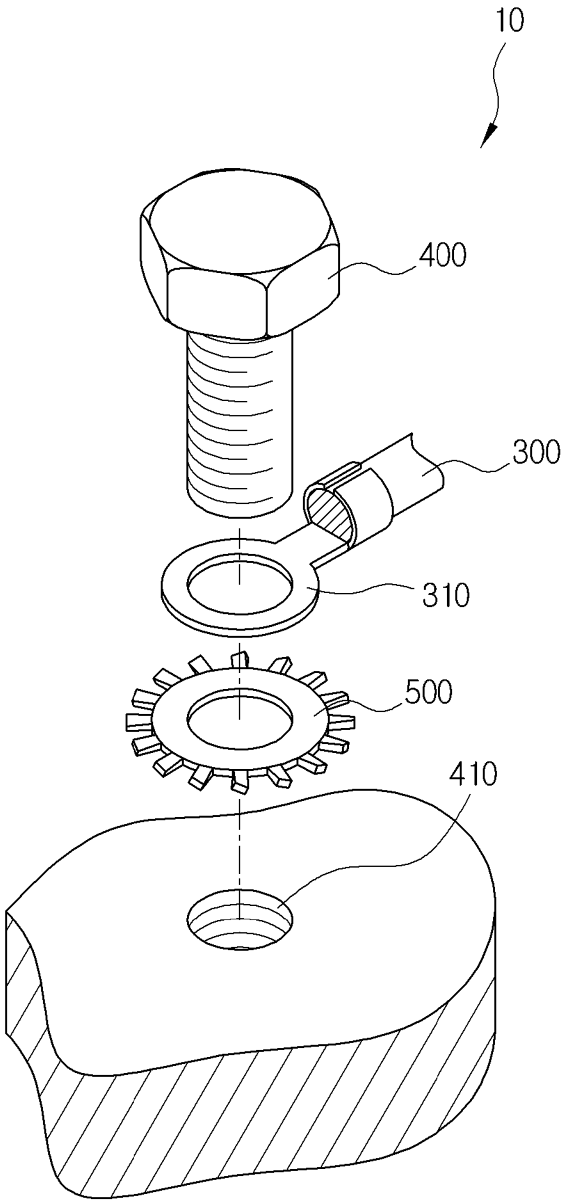
FIG. 5 is an exploded perspective view showing a grounding structure of a high voltage secondary battery for a vehicle according to another exemplary embodiment of the present invention.

FIG. 1 is an exploded perspective view showing a general high voltage battery; FIG. 2 is a plan view of a vehicle in which a battery pack is mounted; FIG. 3 is a plan view of a hybrid vehicle to which a grounding structure of a high voltage secondary battery for a vehicle according to an exemplary embodiment of the present invention is applied; FIG. 4 is a front view showing the grounding structure of a high voltage secondary battery for a vehicle according to the exemplary embodiment of the present invention; and FIG. 5 is an exploded perspective view showing a grounding structure of a high voltage secondary battery for a vehicle according to another exemplary embodiment of the present invention.

The grounding structure 10 of a high voltage secondary battery for a vehicle according to the exemplary embodiment of the present invention is designed in order to ground a secondary battery 110 included in the next generation vehicle such as a hybrid electric vehicle (HEV), an electric vehicle (EV), a plug-in hybrid electric vehicle (PHEV) to allow the entire vehicle to have equipotential.

The grounding structure 10 of a high voltage secondary battery for a vehicle according to the exemplary embodiment of the present invention is configured to include: a battery pack 100 having a plurality of secondary batteries 110 combined in series or parallel with each other and received in a battery case 120; and an inverter 200 for a vehicle converting direct current (DC) voltage output from the battery pack 100 into alternate current (AC) voltage and then outputting the converted AC voltage.

In the grounding structure 10 of a high voltage secondary battery for a vehicle according to the exemplary embodiment of the present invention, the battery pack 100 and the inverter 200 for a vehicle are connected to each other by a ground wire 300 formed of an electric wire to allow the battery pack 100 and the entire vehicle to have equipotential.

Generally, when the next generation vehicle such as the HEV, the EV, the PHEV starts, electricity is supplied to all of the electric components, such that the battery pack 100 is activated and the inverter 200 for a vehicle supplies the electricity to a motor to start the motor.

The inverter 200 for a vehicle is used to convert DV electricity for a vehicle into AC electricity for a home at the time of using a television, a laptop computer, an audio device, or the like, in the vehicle as well as to supply the electricity to the motor.

As shown in FIGS. 3 and 4, in the grounding structure 10 of a high voltage secondary battery for a vehicle according to the exemplary embodiment of the present invention, the battery pack 100 and the inverter 200 for a vehicle are connected to each other by the ground wire 300. In this configuration, a bolt insertion groove 410 into which a bolt 400 may be inserted is formed at a predetermined region of the battery case 120 and a bolt insertion groove 410 into which a bolt 400 may be inserted is formed at a predetermined region of an outer portion of the inverter 200 for a vehicle, such that the ground wire 300 may be wound around the bolts 400 inserted into the bolt insertion grooves 410 at both ends thereof to thereby be fixed.

The bolt insertion grooves 410, which are formed so that the bolts 400 for fixing ground wire 300 may be inserted thereinto, are depressed and formed at the predetermined regions of the battery case 120 and the outer portion of the inverter 200 for a vehicle, but do not penetrate through the battery case 120 and the inverter 200 for a vehicle.

The ground wire 300, which is to allow the inverter 200 for a vehicle and the battery pack 100 to have equipotential, is wound around the bolts 400 to thereby be fixed in a state in which a cover of both ends thereof is removed.

Further, in the grounding structure 10 of a high voltage secondary battery for a vehicle according to the exemplary embodiment of the present invention, it is preferable that the predetermined region of the battery case 120 fixed so that the ground wire 300 is connected thereto is in a state in which it is not painted by paint.

Therefore, in the grounding structure 10 of a high voltage secondary battery for a vehicle according to the exemplary embodiment of the present invention, when an end of the ground wire 300 and the battery case 120 are connected to each other, they are connected to each other after the paint is removed at a portion to be connected. Likewise, it is preferable that the predetermined region of the outer portion of the inverter 200 for a vehicle connected to the ground wire 300 is in a state in which it is not painted.

As shown in FIG. 4, the grounding structure 10 of a high voltage secondary battery for a vehicle according to the exemplary embodiment of the present invention may further include a washer 500 provided between the bolt insertion grooves 410 formed in the battery case 120 and the inverter 200 for a vehicle and the bolts 400 inserted into the bolt insertion grooves 410 in order to improve fixability.

Particularly, the washer 500 may be a toothed lock washer 500 of which an inner surface or an outer surface is formed in a sawtooth shape as shown in FIG. 5. In this case, the washer 500 has a more excellent looseness prevention effect, such that the bolts 400 and both ends of the ground wire 300 may be stably fixed.

Meanwhile, as the ground wire 300, a general electric wire may be used as it is. However, the ground wire 300 may also be used in a state in which a terminal 310 is compressed and fixed to the ground wire 300 of which the cover of both ends is removed, such that a core wire in which current may flow is exposed.

Here, the terminal 310 compressed and fixed to both ends of the ground wire 300 to thereby be connected thereto may have a ‘C’ shape so as to enclose the bolt 400. Alternatively, the terminal 310 has an ‘O’ shape as shown in FIG. 5, such that the bolt 400 may be inserted into a hollow region in the terminal to thereby be fixed together with the washer 500.

Meanwhile, in the grounding structure 10 of a high voltage secondary battery for a vehicle according to the exemplary embodiment of the present invention, it is preferable that the ground wire 300 is connected at the shortest length.

As shown in FIG. 3, it is preferable that the ground wire 300 connected between the battery pack and the inverter 200 for a vehicle is grounded at the shortest distance so as not to cause electromagnetic interference (EMI) or a problem in electromagnetic compatibility (EMC). To this end, the ground wire 300 is connected to the inverter 200 for a vehicle.

Therefore, in the grounding structure 10 of a high voltage secondary battery for a vehicle according to the exemplary embodiment of the present invention, it is preferable that the ground wire 300 is connected to a portion at which a distance between the battery pack 100 and the inverter 200 for a vehicle is the shortest. Further, in the case in which the ground wire 300 is fixed using the bolts 400 as described above, it is preferable that the bolt insertion grooves 410 are formed in a predetermined region of the outermost portion of the battery case 120 and a predetermined region of the outermost portion the most adjacent to the battery case 120.

As set forth above, with the grounding structure of a high voltage secondary battery for a vehicle according to the exemplary embodiment of the present invention, the inverter 200 for a vehicle provided in the next generation vehicle such as the HEV, the EV, and the PHEV and the battery pack 100 including the secondary batteries 110 are connected to each other by the ground wire 300 formed of the electric wire in order to allow the vehicle body and the battery pack 100 to have equipotential, thereby making it possible to secure stable ground potential of various electric devices included in the vehicle and reduce a risk factor that may be generated due to a potential difference.

In addition, with the grounding structure 10 of a high voltage secondary battery for a vehicle according to the exemplary embodiment of the present invention, the battery pack 100 and the inverter 200 for a vehicle are connected to each other to ground, such that a smaller potential difference is generated as compared to the case in which the secondary battery is grounded through the connection of the vehicle body, thereby making it possible to improve electrical stability of the vehicle.

Further, with the grounding structure 10 of a high voltage secondary battery for a vehicle according to the exemplary embodiment of the present invention, the battery pack 100 and the inverter 200 for a vehicle are connected to each other at a distance as short as possible, thereby making it possible to minimize the EMI/EMC problem.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A grounding structure of a high voltage secondary battery for a vehicle for grounding a secondary battery provided in a vehicle to allow the entire vehicle to have equipotential, the grounding structure comprising:

a battery pack having a plurality of secondary batteries combined in series or parallel with each other and received in a battery case; and an inverter for a vehicle converting direct current (DC) voltage output from the battery pack into alternate current (AC) voltage and then outputting the converted AC voltage, wherein the battery case of the battery pack and the inverter for a vehicle are directly connected to each other by a ground wire formed of an electric wire.

2. The grounding structure of claim 1, further comprising a bolt insertion groove formed both at a predetermined region of the battery case and at a predetermined region of an outer portion of the inverter for a vehicle and having a bolt inserted thereinto, such that the ground wire is wound around the bolts inserted into the bolt insertion grooves at both ends thereof to thereby be fixed.

3. The grounding structure of claim 2, further comprising a washer provided between the bolt insertion grooves formed in the battery case and the inverter for a vehicle and the bolts inserted in the bolt insertion grooves.

4. The grounding structure of claim 3, wherein the washer is a toothed lock washer formed in a sawtooth shape.

5. The grounding structure of claim 4, wherein a predetermined region of the battery case fixed so that the ground wire is connected thereto is in a state in which it is not painted by paint.

* * * * *